United States Patent [19]

Paoluccio

[11] Patent Number: 4,555,201

[45] Date of Patent: Nov. 26, 1985

[54] SEDIMENT DIKE APPARATUS AND METHODS

[76] Inventor: John A. Paoluccio, 3530 Kiernan St., Modesto, Calif. 95356

[21] Appl. No.: 551,361

[22] Filed: Nov. 14, 1983

[51] Int. Cl.[4] .......................... E02B 3/06; E02B 7/06; E02D 25/00

[52] U.S. Cl. ..................................... 405/117; 405/21; 405/204

[58] Field of Search ....................... 405/15, 16, 19, 21, 405/34, 91, 98, 107, 110, 111, 115–117, 204, 229, 18, 23, 25, 30–32, 35; 404/6

[56] References Cited

U.S. PATENT DOCUMENTS

| | | | |
|---|---|---|---|
| 3,373,568 | 3/1968 | Hornbostel | 405/21 |
| 3,538,711 | 11/1970 | Nielsen | 405/23 |
| 3,568,453 | 3/1971 | Ziegenmeyer | 405/115 X |
| 3,597,926 | 8/1971 | Riddett | 405/115 |
| 3,886,751 | 6/1975 | Labora | 405/107 |
| 3,890,802 | 6/1975 | Auriat | 405/117 |
| 3,957,098 | 5/1976 | Hepworth et al. | 405/19 X |
| 4,009,580 | 3/1977 | Dowse | 905/204 |
| 4,081,970 | 4/1978 | Dowse | 405/204 |
| 4,103,502 | 8/1978 | Cashman | 405/117 X |

FOREIGN PATENT DOCUMENTS

| | | | |
|---|---|---|---|
| 60578 | 9/1982 | European Pat. Off. | 405/117 |
| 2815256 | 10/1979 | Fed. Rep. of Germany | 405/115 |
| 863 | 9/1915 | Netherlands | 405/107 |
| 7408546 | 12/1975 | Netherlands | 405/21 |
| 889784 | 12/1981 | U.S.S.R. | 405/117 |

Primary Examiner—Cornelius J. Husar
Assistant Examiner—Nancy J. Stodola
Attorney, Agent, or Firm—Robert S. Smith

[57] ABSTRACT

A method and apparatus for constraining a liquid such as water, either alone or mixed with sand, soil or the like and which includes providing an envelope and pumping a mixture of water and soil into the envelope.

8 Claims, 15 Drawing Figures

U.S. Patent  Nov. 26, 1985  Sheet 1 of 5  4,555,201
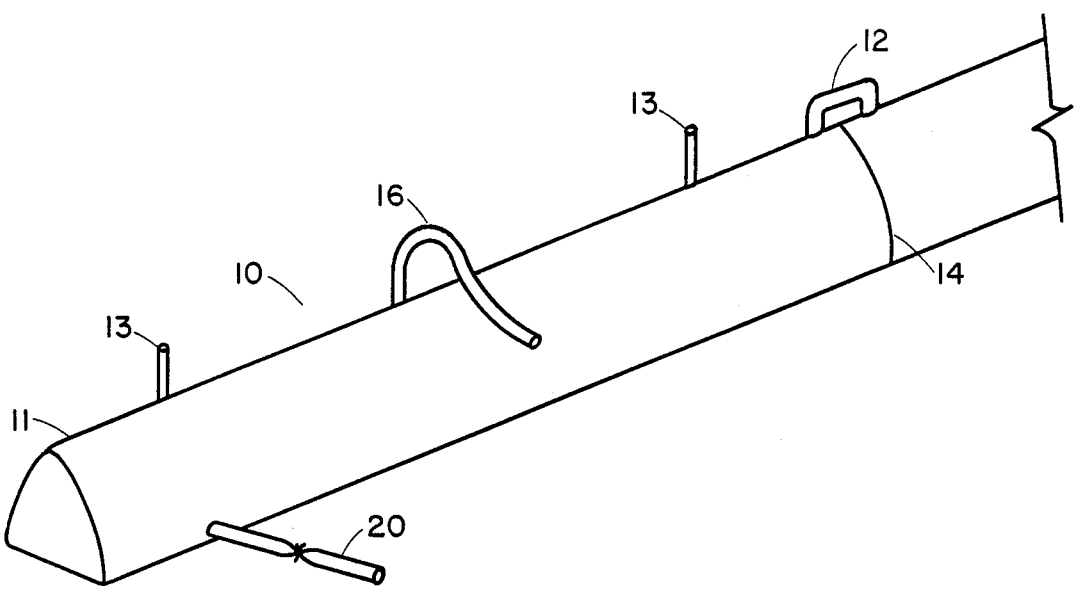
FIGURE 1
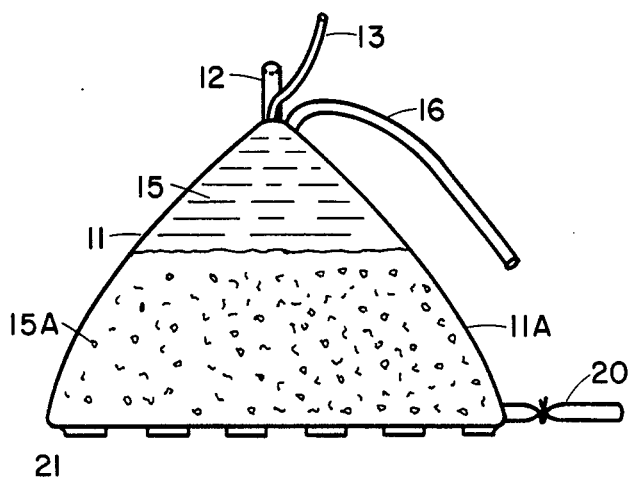
FIGURE 2
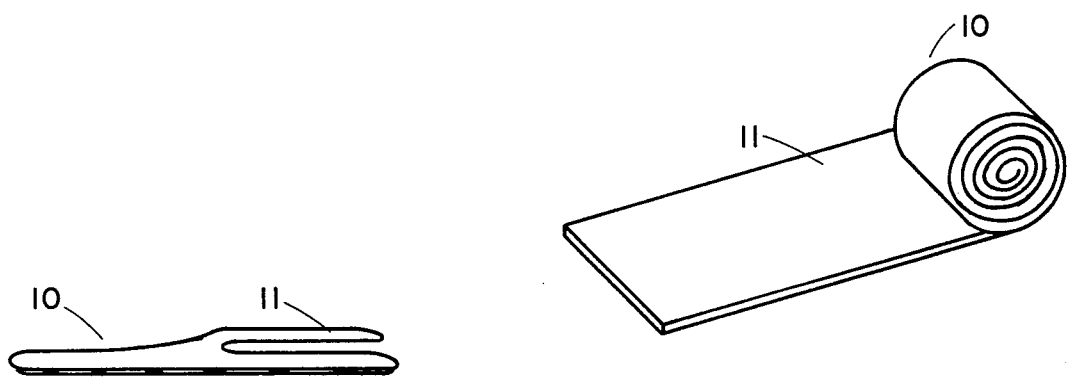
FIGURE 3
FIGURE 4

SEDIMENT DIKE APPARATUS AND METHODS

BACKGROUND OF THE INVENTION

The invention relates to dams, dikes and the like and particularly to collapsible structures which are filled at the site of ultimate use.

The prior art includes the widely used sandbags, which are customarily filled at a remote site and then moved to the location where it is necessary to constrain rising water to prevent flooding. Sandbag barriers have significant limitations in that a large number of people are required to place them in position to stop rising waters. In addition, the movement of sandbags for such use is often complicated by the rising waters with which they are intended to constrain. More specifically, the water may rise over highways and railroad tracks and, thus, prevent easy movement of sandbags to the required site. Still another problem associated with the use of sandbags is that there is a substantial amount of work involved in filling, storing and handling sandbags.

The prior art includes a variety of collapsible dikes, which typically are filled with water. Such structures are shown in the following U.S. Pat. Nos. 3,834,167, 2,609,666, 3,355,851, 3,213,628 as well as in United Kingdom Pat. No. 2,044,828. Such structures have also not been wholly satisfactory. These structures have, for example, not always provided a sufficiently stable barrier to rising flood waters. A difficulty with many of the water filled dike constructions is that a leakage of water from the fluid impervious envelope, such as through an opening caused by a tear, will tend to render the entire structure ineffective.

An object of the invention is to provide a simple and efficient method of protecting riverbanks from overflowing during flooding conditions.

Another object of the invention is to use an apparatus which can be easily transported to a perspective flood area.

It is still another object of the invention to provide apparatus that is so effective and so easy and fast to apply that there will be no hesitation in setting up a temporary sediment filled dike when the threat of flooding arises.

Yet another object of the invention is to provide apparatus which will be less vulnerable to the effects of tears and the like than existing water filled structures.

SUMMARY OF THE INVENTION

The foregoing objects and other objects and advantages which shall become apparent from the detailed description of the preferred embodiment are attained in a method of constraining a liquid such as water and sand, which includes providing an envelope and pumping a mixture of water and soil into the envelope. The providing step may include providing an envelope having at least portions of which are fluid pervious. The providing step may include providing an envelope having fluid pervious sections disposed on a face remote from a body of associated water and some of which are proximate to an associated body of water.

The invention also includes a collapsible dike structure which is elongated and is dimensioned and configured for positioning adjacent to the side of a body of water. The envelope may have a height at least equal to the height of the water up above the base of the envelope which the dike structure is intended to constrain. The dike structure may have at least a portion which is fluid permeable. The fluid permeable portion may extend along an inclined or generally vertical first face thereof which is disposed away from the body of water to be constrained. The fluid permeable portion may extend along the first face thereof which is disposed proximate to the body of water to be constrained.

BRIEF DESCRIPTION OF THE ACCOMPANYING DRAWING

The invention will be better understood by reference to the accompanying drawing in which:

FIG. 1 is an isometric view of a sediment dike in accordance with the invention and details of the construction.

FIG. 2 is a cross-section of a sediment dike and illustrates its construction in greater detail.

FIG. 3 is a cross-section of the dike apparatus in a dry, flat, deflated condition.

FIG. 4 is an isometric view of a dike apparatus in a dry, deflated, rolled up condition as it may be when stored.

DESCRIPTION OF THE PREFERRED EMBODIMENT

Figure 5:
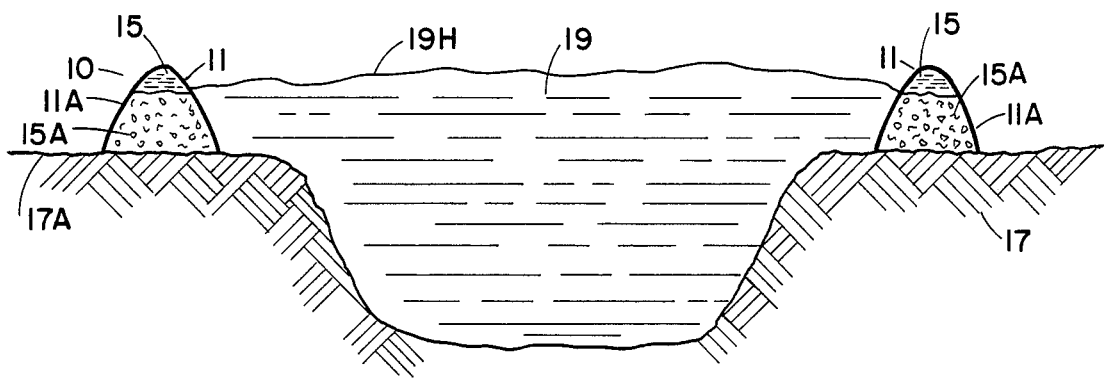
FIG. 5 is a cross-sectional view of an overflowing river with the water held back by a sediment dike on each side of the river.
Figure 6:
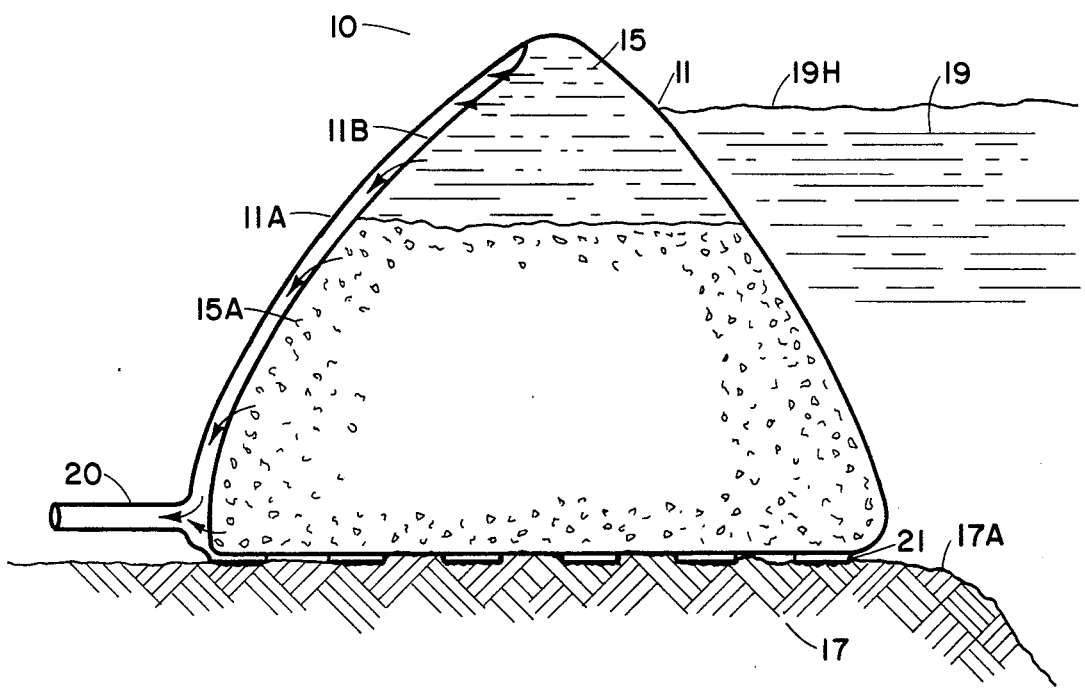
FIG. 6 is an enlarged cross-section of a sediment dike with water being drained through a porous wall to a chamber defined between the porous wall and a fluid impervious wall, leaving sediment in the apparatus; the bottom surface has an irregular, rough surface.
Figure 7:
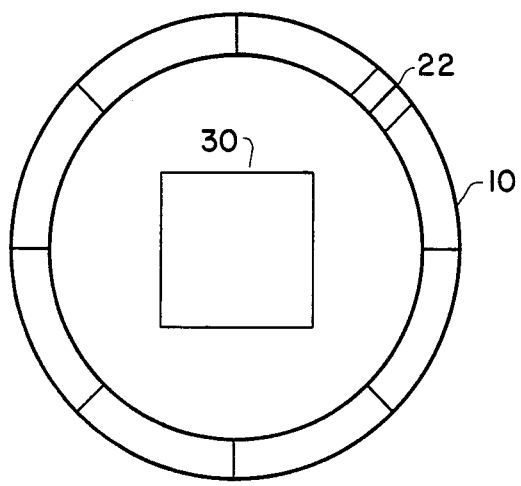
FIG. 7 is a plan view of a sediment dike surrounding a structure that is to be protected.
Figure 8:
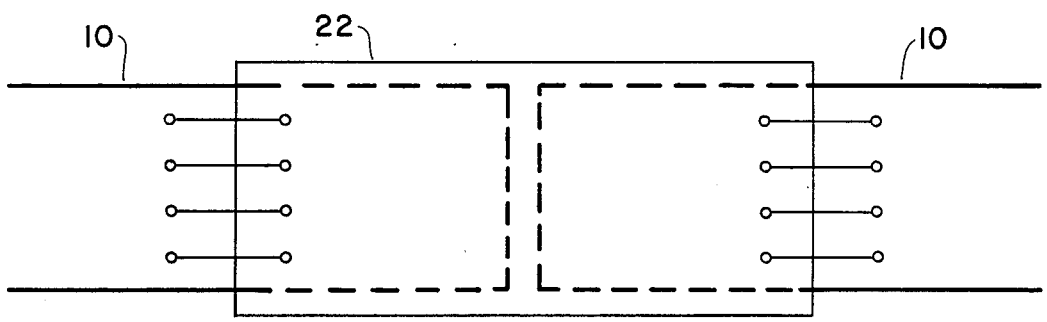
FIG. 8 is an elevational view of a connection sleeve that seals and connects the ends of the dike apparatus.

Referring now to FIGS. 1–13, a collapsible dike 10 includes a flexible enclosure 11, which may be made of plastic, neoprene-impregnated canvas, fiberglass, rubber or the like and which is stored in the deflated dry position. When a river 19 threatens to overflow its banks, the dike 10 is put into operation.

The dike 10 is first positioned along a bank 17 of a river 19. The discharge end of a pumping system 18D is then attached to a conduit 16 of a deflated enclosure 11. The suction end of a pump 18A is placed in the bed of the river 19 so that a pump ejector 18C will fill the enclosure 11 with water and soil. (The term "soil" as used herein, will be understood to include dirt, sand, soil, and even small rocks which are disposed on the earth's crust.) The enclosure 11 acts as the dike 10, which will hold back rising flood waters. A base 21 of the enclosure 11 and its actual shape cause a frictional force which prevents sliding of the structure away from rising flood waters 19H.

The dike 10 will include at least one face which is a tough vinyl or rubber-like material. Ordinarily, this face will be toward the river 19. The bottom surface or base 21 would be shaped and have a surface to cause the maximum amount of friction to oppose any force produced by the river water 19 which would tend to slide the dike 10 away from the river 19. In one preferred form, the dike 10 will have a cross-sectional shape similar to an equilateral triangle. Various other contours will be preferable for some conditions.

Along the length of the dike 10 there may be pull-string type operated close-off transfer valves 12. These close-off transfer valves 12 would be used to prevent the entire dike 10 from failure due to a rupture in one axial portion. The length of the dike 10 and its cross-sectional height will depend primarily on its specific application. Axial sections of the envelope 11 may have a mutually interlocking shape. In one form of the invention the dike 10 has a length of 1000 ft. and a height of 4 ft., although both dimensions may be altered in other embodiments. The actual filling of the dike 10 with water and soil may be accomplished with any of various commercially available pumping systems 18D. A simple gold-dredge pumping unit with a suction ejector would work well. To assure (1) the complete filling of the dike 10 with water and soil, and (2) the complete removal of air, a small open tube 13 may be located on the top of the dike 10. As the water and soil fill the dike 10, any air that enters the envelope 11 will be expelled through the tube 13. The tube 13 will also act to cause a slight internal pressure on the envelope 11 due to the additional head of water which it causes. This increase in pressure will be beneficial since it will increase the rigidity of the envelope 11. Water and soil would be continually pumped into the enclosure 11, the water portion being continually drained away through a drain 20 and the overflow 13. Sediment would build up eventually filling the dike 10 and thereby making the sediment filled dike 10. As water is drained, the sediment forms a rigid body. The envelope 11 will, of course, be stored in a deflated, dry, rolled-up position. The envelope 11 may have one face 11A, which is fluid pervious or may have a face 11A which is fluid impervious and a face 11B which is fluid pervious. This will aid in rapid draining of water.

The invention also includes the method which includes providing the envelope 11 which is constructed with at least a portion being the fluid pervious member 11A. The method includes filling the envelope 11, having the fluid pervious portion 11A, with a mixture of soil and water. Thus, the invention relies on the wet media which has been pumped and which has a specific gravity which is greater than either the specific gravity of soil or water. In other words, the combination of soil and water has a specific gravity greater than either one. The method may also include providing the fluid pervious portion 11A of the envelope 11 which is fluid impervious. The fluid pervious portion 11A may be disposed away from the body of water such as the river 19 bed, which is intended to be contained. Thus, this selective porosity directs water away from a given area. Other embodiments may utilize the fluid pervious face 11A abutting the flood waters to be constrained. Accordingly, a slurry may be pumped from the body of water such as the river 19 bed into the dike envelope 11 which is porous on the side away from the river 19 bed so that a wet slurry remains in the enclosure to provide a solid support for the dike 10 and a controlled amount of water runs off through the porous sections away from the river 19 bed so that still further flood control and other benefits would be realized. In other embodiments the fluid pervious section 11A may face the body of water to be constrained.

Experimental test data indicates that the envelope 11 may be constructed with a contour that is cylindrical. The contour of the envelope 11 refers, of course, to the contour when not in any way constrained, since any flexible member will have the contour thereof changed when a huge mass of slurry bears on the wall and that wall rests on a surface having some characteristic shape. Such envelopes 11 have been found to be effective on grass as well as on concrete surfaces and also to function on dry as well as wet surfaces. Experimental data indicates a round cross-section with the base 21 constructed of rubber will be particularly effective.

The dike 10 in accordance with the invention has many advantages over all other present methods of preventing rising water from causing flooding. For example, the dike 10 may be set up by two men very rapidly even in embodiments having a long axial dimension. The invention has neither a weight nor a bulk problem such as that encountered with sandbags.

The invention eliminates the cost of sandbags, which currently runs approximately ten to twenty cents per bag. The labor of storing, transporting and handling of the sandbags is also completely eliminated.

The envelope 11 will ordinarily be stored in the deflated condition and then fill adjacent to a river 19 or other body of water. The filling will ordinarily be accomplished by pumping at a very rapid rate. The dike 10 may even be manually filled with water and soil if necessary.

As a specific example to illustrate the advantage of using the present invention over sandbags, consider the envelope 11 with its cross-sectional view in the shape of an equilateral triangle and having a 4' height and a total length of 1,000 ft. The total internal volume of this dike 10 is approximately 9,000 cu. ft. It would take two pumps 18A, each with a capacity of 560 GPM, one hour to completely fill the envelope 11, thus erecting a 4 ft. high, 1,000 ft. long dike 10. From this example one can clearly see the tremendous savings in time, manpower and cost over the use of sandbags. Since there is always urgency associated with holding back rising flood waters, the speed with which the dike 10 in accordance with the invention may be erected is particularly advantageous. The 4 ft. dike 10 height would easily protect against water rising about 2 to 3 ft., depending upon the coefficient of static friction. When the contents are primarily soil, it will protect to its full height.

Figure 14:
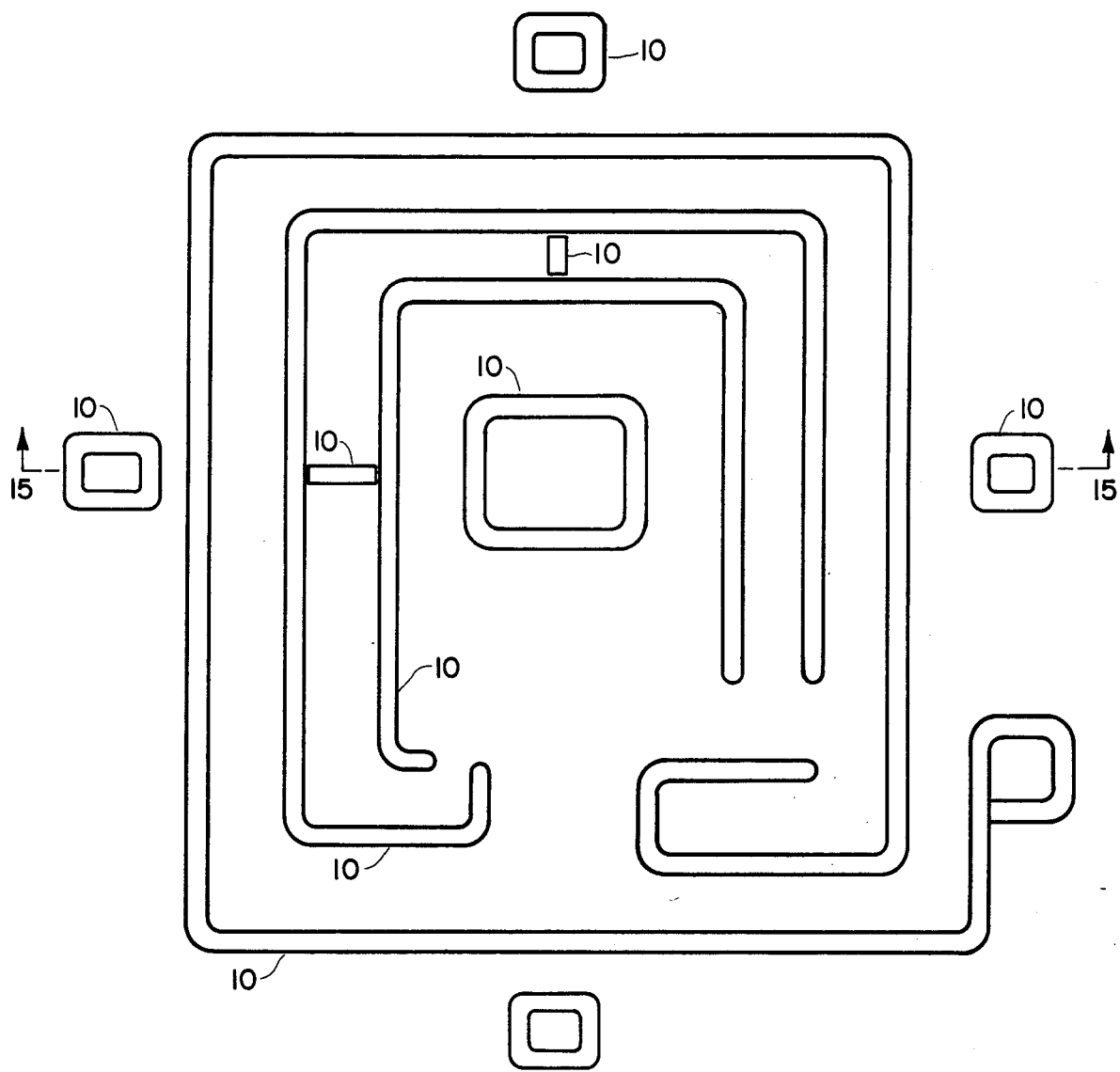
FIG. 14 is a schematic plan view of the apparatus used for a personnel protection device in military applications.
Figure 15:
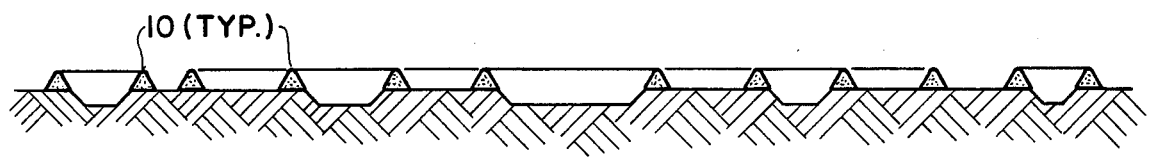
FIG. 15 is a cross-sectional view of the apparatus shown in FIG. 14.

Many applications for the method apparatus in accordance with the invention are apparent. For example, as shown in FIGS. 14 and 15, the apparatus may be used for military applications to protect personnel and installations. Thus, an effective barrier may be provided to protect against sniper fire or even so called truck bombs or car bombs. The invention allows the rapid errection of a barrier having a large mass which provides substantial protection even from heavy vehicles. An additional advantage is that a hole in the ground used to collect the soil for the barrier may serve as a foxhole. As in other applications, the filling for the barrier may include cement.

Figure 9:
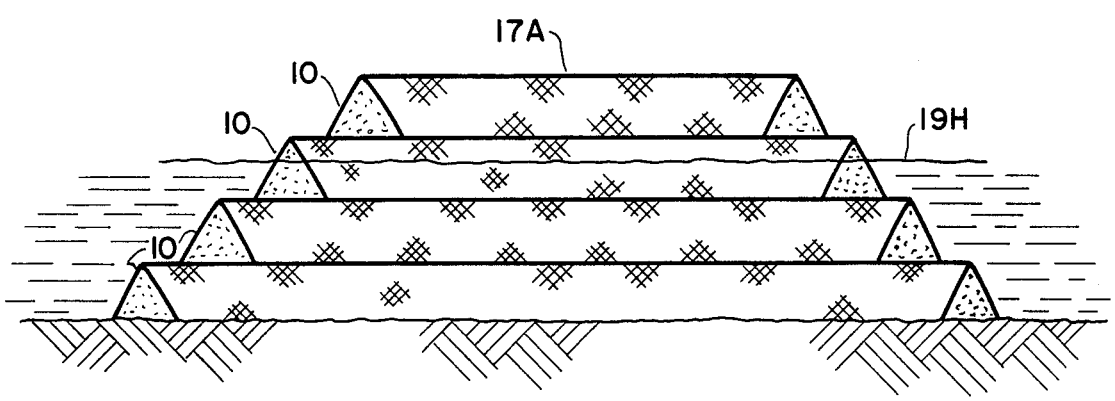
FIG. 9 is an elevational view, in partial section, of a series of sediment dikes being used to form an island. The total contained area of each concentric sediment dike is successively filled with sediment to form a permanent island.
Figure 10:
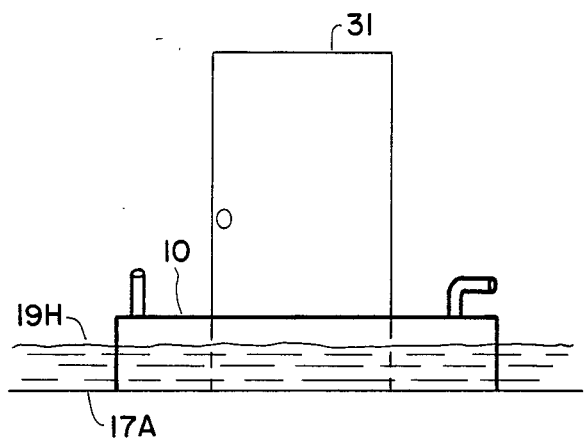
FIG. 10 is an elevational view showing a sediment dike used to seal a low doorway from flood water.
Figure 11:
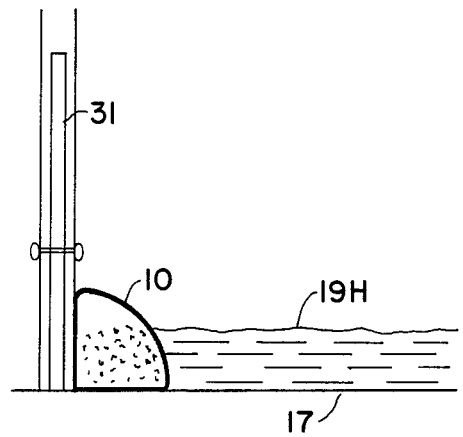
FIG. 11 is a partially schematic cross-sectional view of the sediment dike protecting the doorway shown in FIG. 10.
Figure 12:
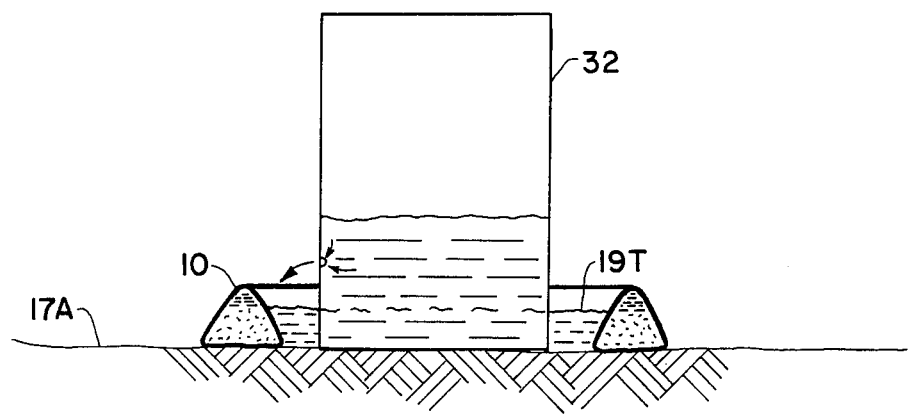
FIG. 12 is an elevational view of a sediment dike being used to contain a leaking fluid from a ruptured tank.
Figure 13:
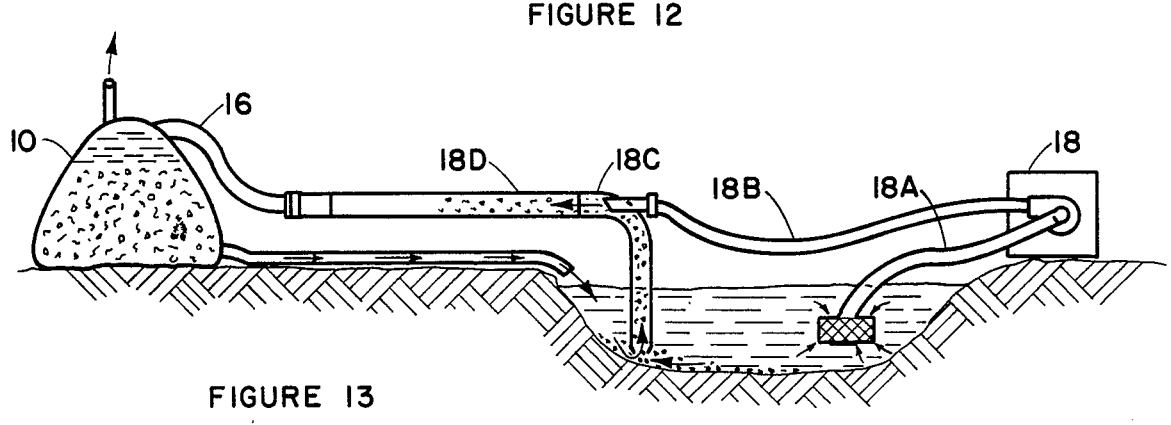
FIG. 13 is a schematic view of a pump system filling a sediment-filled dike in which a jet ejector picks up soil, sand and rocks without going through the pump, such as common gold dredge pump units that use the same components.

In still other applications the barrier, in accordance with the invention, constrains a fluid within a closed barrier such as a circle instead of keeping the fluid away, as in the typical flood water situation. See, for example, FIGS. 7 and 8 which show the barrier or dike 10 which surrounds a structure 30 and which is joined at the ends thereof by a sleeve 22 tied to the ends of the barrier 10. FIG. 9 illustrates how the barrier 10 may be used to form an "island" by filling the enclosed area with sediment, concrete, or other material. Ordinarily, the top 17A of the "island" will have an elevation which will equal the elevation of the top of the barrier 10. This elevation will ordinarily be well above the water level 19H. FIG. 10 illustrates the step of positioning the barrier 10 on the ground 17 against a doorway 31 to seal the doorway 31 from the rising water 19H. FIG. 11 is a partially schematic edge view of the same structure 30. FIG. 12 illustrates how a leaking structure 32 may be encircled with the barrier 10 disposed on the ground 17A. The level of a leak 19T is below the top of the barrier 10. Other variations of the method include the step of positioning the sediment filled envelope surrounding a structure to either keep fluid either away from or constrained around the structure. The envelope may be filled with cement, water and sand to form a permanent dike.

The invention has been described with reference to its illustrated preferred embodiment. Persons skilled in the art of constructing dikes and other such environmental protection apparatus may, upon exposure to the teachings herein, conceive variations in the mechanical development of the components therein. Such variations are deemed to be encompassed by the disclosure, the invention being delimited only by the appended claims.

Having thus described my invention, I claim:

1. The method of constraining a liquid such as water, either alone or mixed with sand, soil or the like, which includes:
   providing an envelope which includes means for draining a liquid therefrom, and said means including providing an envelope having a first face having at least portions of which are fluid pervious and a second face which is impervious to a fluid; and
   pumping a mixture of water and soil into said envelope.

2. The method as described in claim 1, wherein:
   said providing step includes providing an envelope having fluid pervious sections disposed on a face remote from a body of associated water.

3. The method as described in claim 2, wherein:
   said providing step includes providing an envelope having at least portions of which are fluid pervious and are proximate to an associated body of water.

4. The method as described in claim 1, including the step of positioning the envelope substantially surrounding a structure to thereby protect said structure from rising water.

5. The method as described in claim 1, including the step of positioning the envelope filled with water and soil substantially surrounding a structure to contain any fluid leaking from said structure.

6. The method as described in claim 1, including the step of positioning the envelope filled with water and soil substantially surrounding an area and including the step of depositing sediment on this area to form a raised island.

7. The method as described in claim 1, including the step of filling the envelope with water, sand and cement to form a solid permanent dike.

8. The method of providing a protective surrounding for a military installation or military troops, which comprises:
   providing an envelope which includes means for draining a liquid therefrom, and said means including providing an envelope having a first face having at least portions of which are fluid pervious and a second face which is impervious to a fluid; and
   pumping a mixture of water and soil into said envelope.

* * * * *